United States Patent
Yoshihara (10) Patent No.: US 7,918,299 B2
(45) Date of Patent: Apr. 5, 2011

(54) REAR SUSPENSION OF SNOW VEHICLE

(75) Inventor: Masanori Yoshihara, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 156 days.

(21) Appl. No.: 12/100,454

(22) Filed: Apr. 10, 2008

(65) Prior Publication Data

US 2009/0188737 A1 Jul. 30, 2009

Related U.S. Application Data

(60) Provisional application No. 61/024,610, filed on Jan. 30, 2008.

(51) Int. Cl.
*B62M 27/02* (2006.01)
*B62D 55/104* (2006.01)

(52) U.S. Cl. ......... 180/193; 180/9.5; 180/9.25; 305/128

(58) Field of Classification Search .................. 180/9.1, 180/9.25, 9.5, 9.52, 184, 185, 190, 193; 305/124, 305/127, 128, 131
See application file for complete search history.

(56) References Cited

U.S. PATENT DOCUMENTS

| | | | | |
|---|---|---|---|---|
| 3,773,126 A * | 11/1973 | Irvine | ........................... | 180/9.58 |
| 3,879,092 A * | 4/1975 | Rose | .............................. | 305/127 |
| 3,966,181 A * | 6/1976 | Lessard | ......................... | 267/275 |
| 4,093,033 A * | 6/1978 | Rosch | ........................... | 180/9.56 |
| 4,222,453 A * | 9/1980 | Fixsen et al. | .................. | 180/193 |
| 4,305,476 A * | 12/1981 | Blass et al. | ..................... | 180/9.54 |
| 4,407,386 A * | 10/1983 | Yasui et al. | .................... | 180/193 |
| 4,431,078 A * | 2/1984 | Ebert et al. | .................... | 180/193 |
| 4,987,965 A * | 1/1991 | Bourret | .......................... | 180/193 |
| 5,014,805 A * | 5/1991 | Uchida | .......................... | 180/184 |
| 6,109,382 A * | 8/2000 | Kubota | ......................... | 180/190 |
| 6,283,241 B1 * | 9/2001 | Kubota | .......................... | 180/193 |
| 7,226,136 B2 | 6/2007 | Blanchard | | |
| 2004/0195024 A1 * | 10/2004 | Takahiko et al. | ............. | 180/193 |
| 2005/0061578 A1 * | 3/2005 | Schulte | .......................... | 181/227 |

* cited by examiner

*Primary Examiner* — Joanne Silbermann
*Assistant Examiner* — Wesley Potter
(74) *Attorney, Agent, or Firm* — Keating & Bennett, LLP (57) ABSTRACT

A rear suspension of a snow vehicle is provided with a slide rail which guides a track belt. The slide rail is made of metal and formed by extrusion. A bent portion is provided on an end of the slide rail to extend to a tip end thereof with a position toward the end being a starting point of bending. A projection, to which one end side of a torque arm supporting a vehicle body is connected, is arranged toward the end of the slide rail so as to project upwards. The projection includes a bracket provided separately from the slide rail and the starting point of bending is positioned in a length range of the projection.

12 Claims, 6 Drawing Sheets

REAR SUSPENSION OF SNOW VEHICLE

BACKGROUND OF THE INVENTION

1. Field of the Invention

The present invention relates to a rear suspension of a snow vehicle.

2. Description of the Related Art

A snow vehicle drives an endless track belt in order to travel on a snow surface. Ordinarily, a slide rail is suspended from a body frame and driving of the track belt is guided by the slide rail. A front end of the slide rail is bent to be curved upwards, a projection is provided in an intermediate position in a length direction of the slide rail on an upper surface thereof to project integrally and upwardly therefrom, and a torque arm for supporting a body frame is connected to the projection. U.S. Pat. No. 7,226,136, for example, has such a construction.

Like the slide rail disclosed in the above-mentioned patent, a slide rail is frequently formed from extruded aluminum. Accordingly, since the slide rail has a high local rigidity near the upwardly projecting portion, the position where the bent portion begins must be clear of the projecting portion having the high rigidity such that freedom in the design of the slide rail is decreased.

SUMMARY OF THE INVENTION

In order to overcome the problems described above, preferred embodiments of the present invention increase the freedom in arranging the location of a starting point of bending of a bent portion on the slide rail having a projection.

According to a preferred embodiment of the present invention, a rear suspension of a snow vehicle having slide rails preferably includes a body portion made from an extruded metal material to guide endless track belts, the body portion including respective ends in a length direction thereof, and at least one of the ends including a bent portion provided over a predetermined length range and bent so that a lower edge thereof gradually increases in height as it extends toward the end. An upwardly extending projection is preferably provided on an upper edge thereof and arranged along the length range which includes a starting point of bending of the bent portion.

With such a construction, since the starting point of bending of the bent portion can be in the range in which the projection having a high rigidity is provided, the freedom in locating the starting point of bending is increased.

Locating the bent portion at the rear end of the body portion is beneficial for traveling both on fresh snow and on hard packed snow.

Also, locating the bent portion at the front end of the body portion decreases the resistance in traveling since the approach to the snow in the traveling direction can be made large.

According to another preferred embodiment of the present invention, the projection is defined by an upper region of a bracket provided separately from the body portion, wherein bending of the body portion is facilitated since the projection is separate from the body portion.

Preferably, a mounting piece having a substantially flat shape projects upwardly and integrally from the upper edge of the body portion, and the bracket is provided on a lower edge thereof with bifurcated leg pieces which are opposed to each other in a vehicle width direction. The bracket is preferably fixed to the body portion with both leg pieces interposing therebetween the mounting piece in a width direction, such that mounting thereof is more stable as compared with the case where it is fixed only on one side surface thereof.

With such a construction, in which the slide rails are opposed to each other in the vehicle width direction, a shaft is provided between the body portions of the slide rails, and both ends of the shaft are screwed to the body portions together with the brackets, an increase in torsional rigidity is achieved by the shaft provided between the slide rails. Since the bracket is mounted using the shaft, it is possible to attain a simplified construction and assembly.

Preferably, the bracket is screwed to the body portion together with an idler wheel which guides the track belt. Thus, the bracket can be mounted using a mounting structure of the idler wheel.

Preferably, the projection is substantially triangular-shaped with an apex at an upper end thereof. A side thereof is positioned toward the bent portion so as to be arcuately curved in a concave direction. With such a construction, the concentration of stress acting on the slide rail and the bracket is reduced.

Preferably, the bracket includes overlapping substantially flat portions in the vehicle width direction, the substantially flat portions having upper ends in close contact and lower ends separated from each other from an intermediate portion so as to provide separate leg pieces. The uneven intermediate portion reinforces the region extending from the closely contacting portions to the leg pieces.

With such a construction, reinforcement of the bracket can be effectively achieved.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

FIGS. 1 to 5 show a first preferred embodiment of the present invention.

Figure 1:
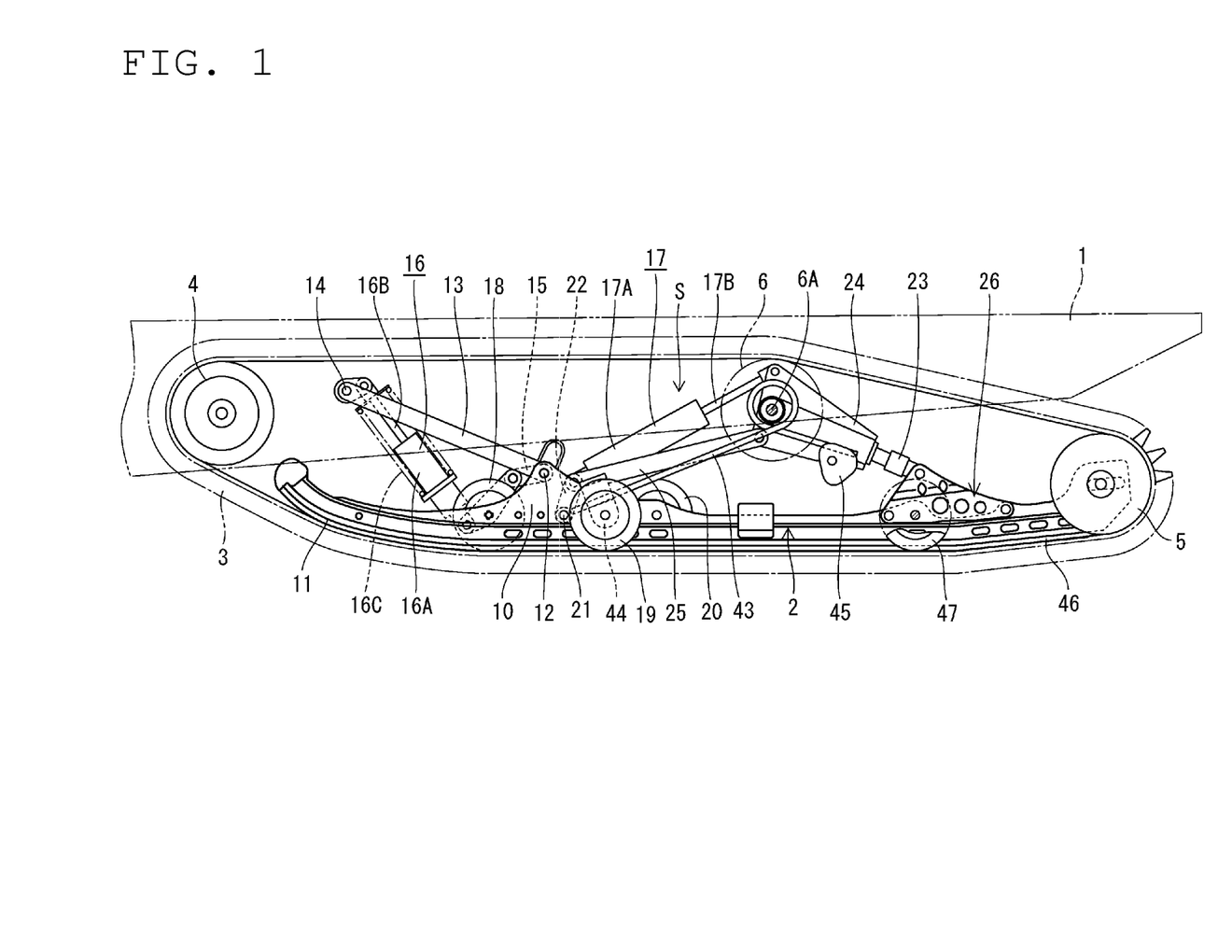
FIG. 1 is a side view showing a rear suspension of a snow vehicle according to a first preferred embodiment of the present invention.

In FIG. 1, reference numeral 1 denotes a body frame of a snow vehicle. A front half of the body frame is supported by a front suspension (not shown) and provided at a front end thereof with a pair of left and right steering skis (not shown), which are steered by a steering handle.

A rear half of the body frame 1 is supported by a rear suspension S. The rear suspension S includes a pair of left and right slide rails 2 suspended from the body frame 1. The slide rails 2 serve to push a track belt 3 against a snow surface to guide the same. The track belt 3 is wound in a manner so as to surround a pair of left and right drive sprockets 4, a lower guide wheel 5, and an upper guide wheel 6 and generally structured to substantially define a parallelogram as seen in a side view. An engine mounted on a front portion of the body frame 1 rotationally drives the drive sprockets 4 to revolve the track belts 3 whereby the snow vehicle can travel over snow.

Figure 4:
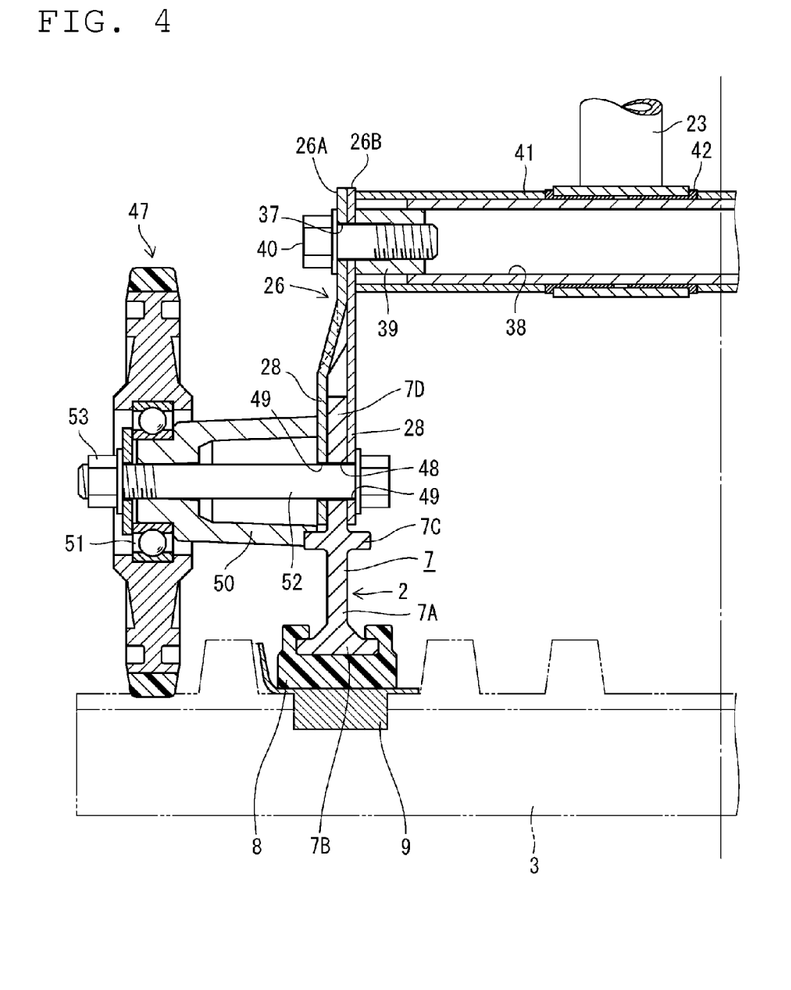
FIG. 4 is a cross-sectional view taken along the line A-A in FIG. 3.

The slide rails 2 are preferably made from aluminum and include an integral body portion 7 preferably formed by extrusion molding. As shown in FIG. 4, the body portion 7 includes a side rail portion 7A having a substantially flat shape extending longitudinally along the vehicle. An integral lower flange edge 7B projects from a lower end edge of the side rail portion 7A in both the left and right directions. A slide block 8 preferably made from a synthetic resin is mounted to an underside of the slide rail 2 over an entire length thereof in a manner to engage the lower flange edge 7B. A metallic track member 9 is mounted to an opposite surface of the track belt 3 over a whole circumference thereof. Accordingly, the track belt 3 is rotationally driven while an upper surface of the track member 9 rubs against a lower surface of the slide block 8.

An integral upper flange edge 7C is arranged above the side rail portion 7A to project in a width direction thereof, which is preferably smaller than that of the lower flange edge 7B, in both the left and right directions. The side rail portion 7A extends further above the upper flange edge 7C to provide a mounting piece 7D for the rear suspension S.

The mounting piece 7D varies in the amount it projects from the upper flange edge 7C according to the strength required for the respective portions thereof, and projects greatly at two fore and aft locations in the present preferred embodiment (see FIG. 1). A front projection 10 disposed in the fore location projects integrally upward in a manner to substantially define a triangular shape with an apex at an upper end thereof (see FIG. 2). The front projection 10 is arranged such that a front ridgeline, i.e., a side of the triangle anterior to the apex with the apex as a boundary thereof, has a curved shape with a large curvature scooping considerably downwardly as compared with a rear ridgeline, i.e., a side of the triangle rearward of the apex.

Figure 2:
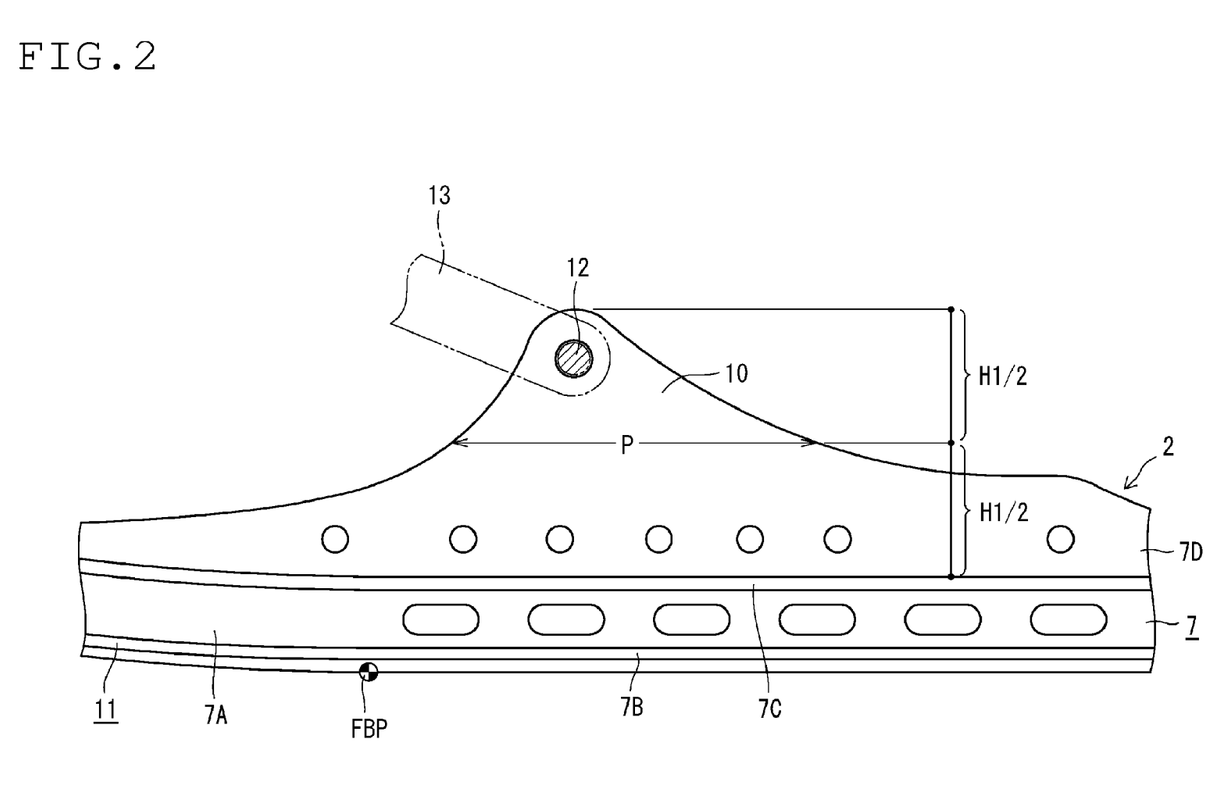
FIG. 2 is a side view showing, in enlarged scale, a periphery of a front bent portion.

In the present preferred embodiment, the front projection 10 means a length region defined in the following manner. That is, as shown in FIG. 2, the front projection 10 means a region higher than the line P in FIG. 2, which is approximately ½ of the height H1 corresponding to the elevation between the upper flange edge 7C in an approximately central region of the slide rail 2 in a length direction and the apex.

A front bent portion 11 is provided at a front end of the slide rail 2. The front bent portion 11 is preferably formed by bending, after the body portion 7 is preferably formed by extrusion molding, to be curved such that a lower surface increases in height as it extends toward the front end, with a location FBP being the starting point of bending in FIG. 2. In the present preferred embodiment, the starting point (FBP) of bending is preferably forward of a position where a region in which the front projection 10 having a high flexural rigidity is provided.

A lower arm shaft 12 is pivotally provided between the tops of the left and right front projections 10, and lower ends of a pair of left and right front torque arms 13, respectively, are joined to widthwise portions of the lower arm shaft 12 toward both ends thereof. Upper ends of both front torque arms 13 are joined to an upper arm shaft 14 extending in a vehicle width direction and both ends of the upper arm shaft 14 are pivotally supported by the body frame 1. Also, one end of a connecting lever 15 is joined to a central portion of the lower arm shaft 12 in the vehicle width direction. An upper end of a front damper 16 is pivotally connected to a central portion of the body frame 1 in the vehicle width direction, and a lower end thereof is connected to the other end of the connecting lever 15.

The front damper 16 cooperates with a rear damper 17, described later, to cushion impact forces from a snow surface and to absorb vertical vibrations. The front damper 16 is arranged to be inclined rearwardly and downwardly from the front of the vehicle, and a piston rod 16B is inserted into a cylinder 16A charged with working oil in order to be able to move in and out of the cylinder 16A. Also, a coil spring 16C is interposed between the piston rod 16B and the cylinder 16A. Further, pairs of first to third idler wheels 18 to 20, respectively, arranged on the left and right are freely rotatably mounted to the front projections 10 to guide and support a lower portion of the track belt 3. The first to third idler wheels 18 to 20 are arranged with spacings therebetween in the longitudinal direction, and in the present preferred embodiment, the first and third idler wheels 18, 20 are arranged inwardly of both slide rails 2 in the vehicle width direction, and the second idler wheels 19 are arranged outwardly of both slide rails 2 in the vehicle width direction.

The rear damper 17 is arranged in a rearwardly inclined posture and centrally in the vehicle width direction so as to be substantially symmetrical with respect to the front damper 16 as viewed from the side. Like the front damper 16, the rear damper 17 includes a piston rod 17B inserted into a cylinder 17A charged with working oil to be able to move and in and out of the cylinder 17A. A lower end of the piston rod 17B in the rear damper 17 is connected to a turning lever 22, one end of which is joined to a rear arm shaft 21 provided pivotally between the front projections 10 on the left and right. An upper end of the piston rod 17B is connected pivotally to an upper end of a support member 24, which is fixed to the body frame 1 to support rear torque arms 23, described later. Front end sides of a pair of left and right intermediate arms 25, which interpose therebetween the rear damper 17, are connected to the shaft of the turning lever 22, to which the rear damper 17 is connected. Rear end sides of both intermediate arms 25 are connected pivotally to a lower surface of the support member 24.

A bracket 26 is mounted in a position toward rear ends of both slide rails 2, the bracket 26 including a rear projection 27, described later. The bracket 26 preferably includes two bracket portions 26A, 26B, which are substantially flat and overlap each other in the vehicle width direction. Both bracket portions 26A, 26B preferably have a substantially triangular-shape with an apex at an upper end thereof. In the present preferred embodiment, as shown in FIG. 4, while the inner bracket portion 26B is formed to be generally flat, an upper portion of the outer bracket portion 26A closely contacts with the inner bracket portion 26B but a lower portion of the outer bracket portion 26A is bent outwardly and obliquely at a boundary between it and the upper portion and then extends downward to separate from the inner bracket portion 26B. Thereby, the bracket 26 is provided at a lower portion thereof with bifurcated leg pieces 28, 28 to interpose the mounting piece 7D of the slide rail 2.

The bracket portions 26A, 26B, which define the bracket 26, are joined together in locations in which they mutually contact in an overlapped state by, for example, spot welding. Also, the outer bracket portion 26A is provided with reinforcement projections 29, which project outward in a boundary portion between the upper portion which contacts closely with the inner bracket portion 26B and the lower portion which includes the bifurcated leg piece 28.

Figure 5:
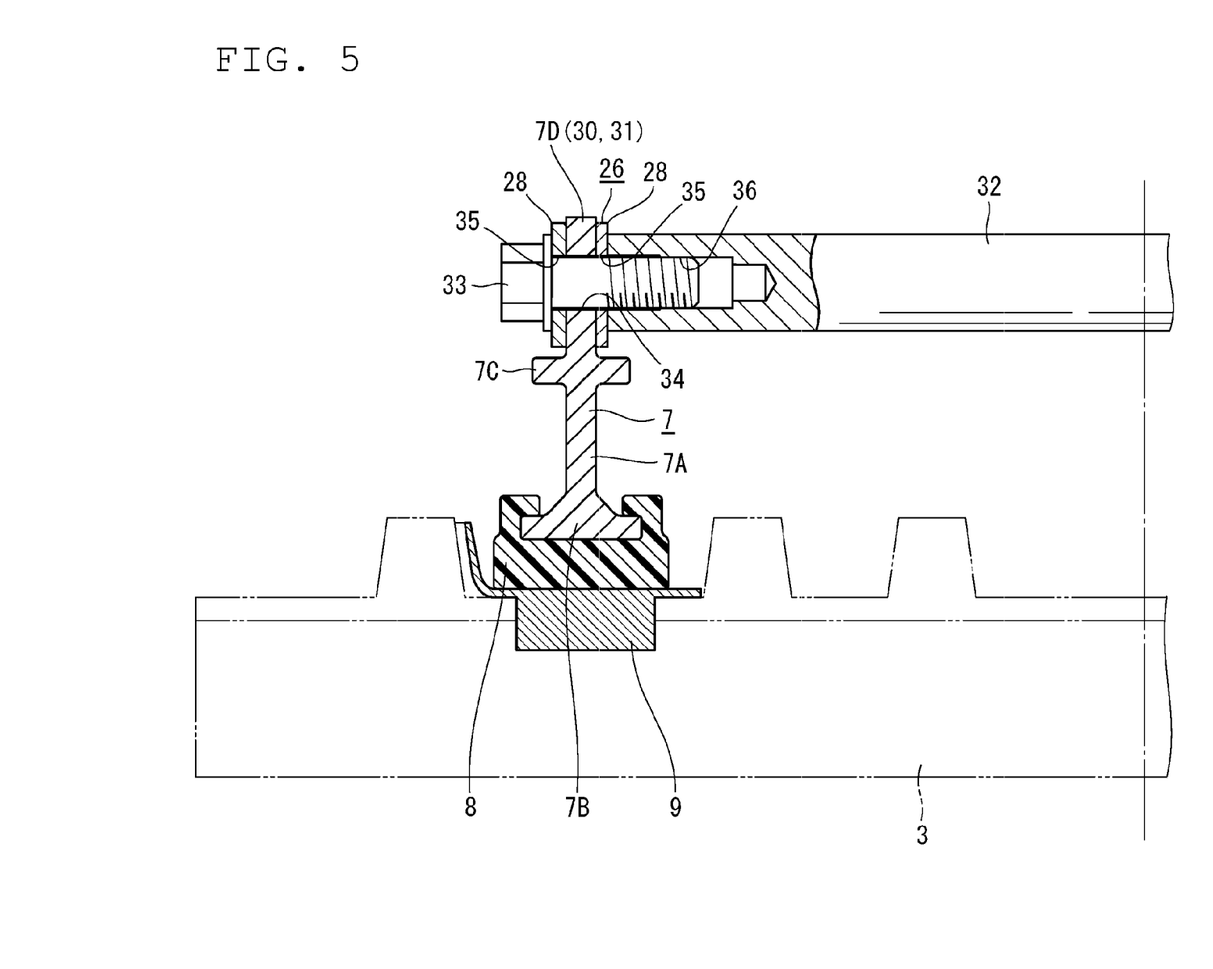
FIG. 5 is a cross-sectional view taken along the line B-B in FIG. 3.

The bracket 26 is mounted to the slide rail 2 in the following manner making use of connecting shafts 32 located between both slide rails 2 (see FIG. 5). Those portions of the mounting piece 7D of the slide rail 2, which correspond to both fore and aft ends of a bottom side of the bracket 26, are provided with fore and aft upward extending portions 30, 31. A through-hole 34, through which a fixing bolt 33 for the bottom connecting shaft 32 extends, is provided on a skirt portion of the fore upward extending portion 30 anterior to an apex thereof, and a similar through-hole 34 is also provided on a top portion of the aft upward extending portion 31. The fore and aft through-holes 34 are aligned coaxially with mounting holes 35, which are provided at both fore and aft ends of the bottom side of the bracket 26 (i.e., the leg pieces 28). A pair of bottom connecting shafts 32 are arranged fore and aft between both fore and aft ends of the bottom sides of the left and right brackets 26, and fixed thereto by screwing the fixing bolts 33 into threaded holes 36, which are provided at both ends of the shafts, from an outward side of the slide rails 2 in the vehicle width direction. The threaded holes are aligned coaxially with the through-holes 34 and the mount holes 35. Thus, the bottom connecting shafts 32 and the brackets 26 are clamped together to the slide rails 2.

Also, the bracket 26 is mounted to the mounting piece 7D by a fourth idler wheel 47 (see FIG. 4). A bolt through-hole 48 is provided on the fore upward extending portion 30 of the mounting piece 7D to extend therethrough, and bolt through-holes 49 also extend through corresponding positions of both bracket portions 26A, 26B. On the other hand, a cylindrical-shaped wheel holder 50 is arranged approximately centrally of the fourth idler wheel 47 to project inward in the vehicle width direction. The fourth idler wheel 47 is mounted rotatably to the wheel holder 50 through a bearing 51. While an axis of the wheel holder 50 is aligned with the bolt through-holes 48, 49, a fixing bolt 52 extends through the leg piece 28 and the mounting piece 7D from an inward side of the bracket 26 and a lock nut 53 is screwed thereon from the outward side of the wheel holder 50. Thereby, the fourth idler wheel 47 and the bracket 26 are clamped and fixed together to the slide rail 2 by the fixing bolt 52.

Mounting holes 37 extend through top portions of both bracket portions 26A, 26B to be aligned coaxially, and a top connecting shaft 38 is provided in a position corresponding to the mounting holes 37 between the left and right brackets 26 in the vehicle width direction (see FIG. 4). The top connecting shaft 38 is preferably made from a hollow pipe material and has nut members 39 mounted to both shaft ends thereof by welding, for example. Fixing bolts 40 are screwed onto the nut members 39 through the mounting holes 37 from an outward side of the brackets 26 in the vehicle width direction whereby the top connecting shaft 38 is fixed.

Axially divided outer tubes 41 are fitted on an outer peripheral side of the top connecting shaft 38 and collars 42 are positioned toward both axial ends thereof to pivotally support the lower end of the rear torque arms 23. The rear torque arms 23 are arranged in parallel on the left and right. Upper ends of the rear torque arms 23 are connected to a pipe (not shown) mounted rotatably to an outer periphery of a wheel shaft 6A of the upper guide wheel 6 fixed to the body frame 1. Both rear torque arms 23 are joined and united together through the support member 24. Thereby, the rear torque arms 23 are increased in torsional rigidity about axes thereof. In addition, both rear torque arms 23 can expand and contract axially as the slide rails 2 move up and down.

A pair of left and right torsion springs 43 are arranged between the body frame 1 and the left and right slide rails 2 to exert a bias in a direction in which the slide rails 2 are separated from the body frame 1. Both torsion springs 43 are wound around a pipe (not shown) mounted rotatably to the wheel shaft 6A of the upper guide wheel 6 to have first ends thereof extending obliquely downward toward the front of the vehicle and supported on a front spring bearing member 44, which is mounted close to the second idler wheels 19 on the slide rails 2. Second ends of both torsion springs 43 are supported on rear spring bearing members 45, which are mounted to lower surfaces of the support members 24 for the rear torque arms 23.

As described above, the brackets 26 are provided in upper regions thereof with the rear projections 27. The region defined by the rear projections 27 on the bracket 26 means a region higher than the line Q in FIG. 3, which is ½ the height (H2) corresponding to the elevation between a position of the upper flange edge 7C on the central region in the length direction of the slide rail 2 and a top of the bracket 26.

Figure 3:
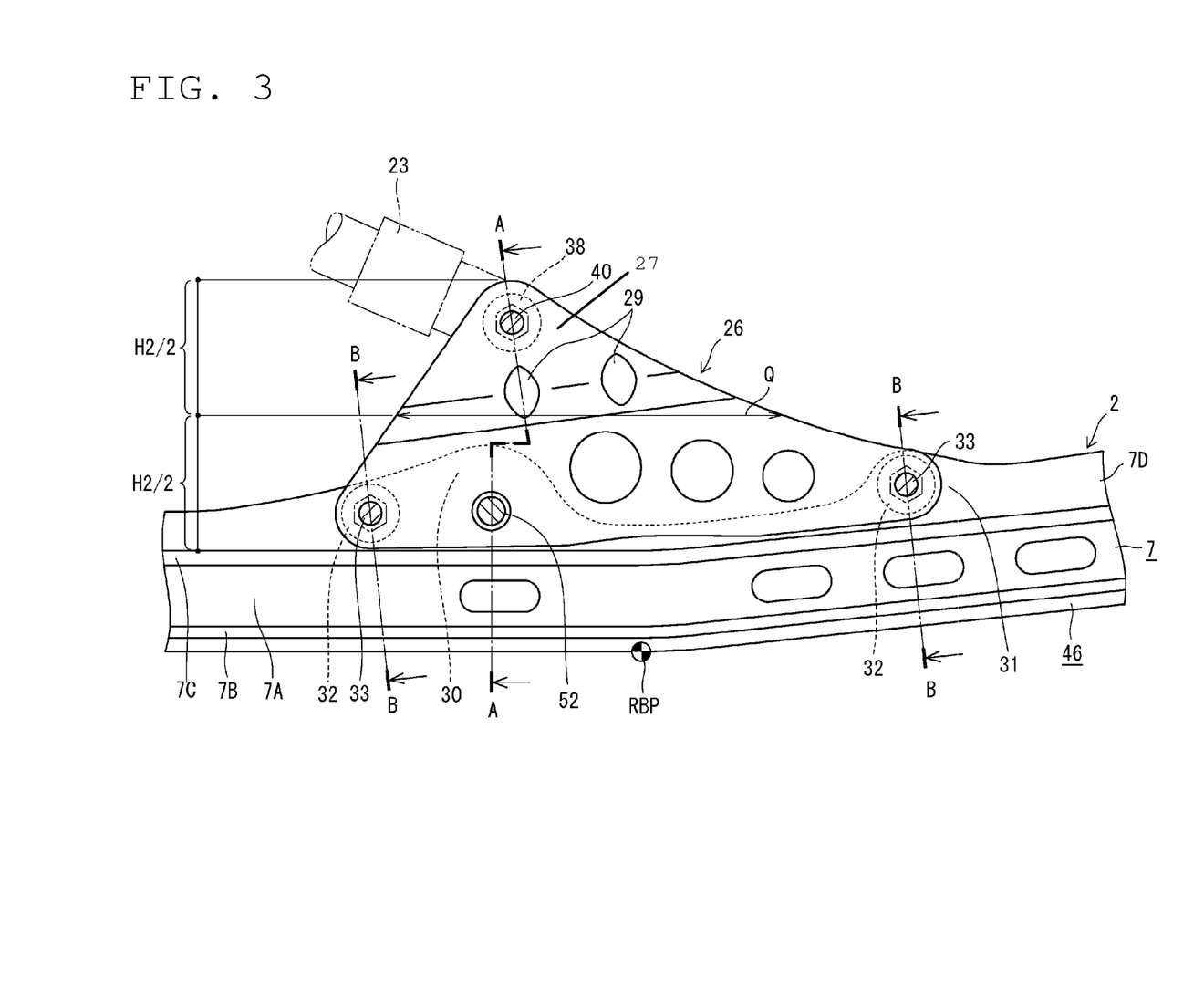
FIG. 3 is a side view showing, in enlarged scale, a periphery of a rear bent portion.

On the other hand, an upwardly curved rear bent portion 46 is arranged at the rear end of the body portion 7 of the slide rail 2. Like the front bent portion 11, the rear bent portion 46 is preferably formed by bending after the body portion 7 is formed by extrusion molding, to extend to a rear end with a location RBP as a starting point of bending, as shown in FIG. 3. In the present preferred embodiment, the rear bent portion 46 is arranged to have a straight inclined surface, or alternatively bent to be arcuately curved, such that a lower surface thereof increases in height as it extends toward a rear end from the starting point RBP of the rear bent portion 46. A position of the starting point RBP of bending on the rear bent portion 46 is disposed within a length range indicated by the line Q in FIG. 3 of the rear projections 27 in the length direction of the slide rail 2. Also, the starting point RBP of bending is positioned toward the rear of the vehicle relative to a position of an axis of the top connecting shaft 38, which supports the rear torque arms 23. Further, in the present preferred embodiment, the starting point of bending of the rear bent portion 46 is positioned between the fore and aft upward extending portions 30, 31 on the mounting piece 7D, that is, in a region, in which the flexural strength is decreased.

As described above, the bracket 26 assumes a substantially triangular shape with an apex in an upper portion thereof as viewed from the side. The aft side of the triangular shaped bracket 26 is preferably longer than the fore side. While the fore side is preferably substantially straight, the aft side is preferably arcuately curved (shaped downwardly convexly) in a direction in which the rear projection 27 is concave inward. The reason for such a curved shape is that stress acting on the bracket 26 is distributed. Also, in the present preferred embodiment, a profile of the curved portion on the bracket 26 is made contiguous to a curved profile of an upper edge of the mounting piece 7D. Thereby, it is possible to further effectively distribute the stress as described above.

The first preferred embodiment is defined as described above. Since the rear bent portion 46 of the slide rail 2 is preferably formed by bending after the body portion 7 is formed by extrusion molding, bending at this time becomes difficult when the slide rail 2 has a high rigidity. In particular, since the protruding region in which the rear projections 27 connect to the rear torque arms 23 have a high local rigidity, it is conventionally necessary to locate the starting point of bending away from this protruding region. However, since the rear projections 27 are defined by an upper region of the bracket 26, which is separate from the slide rail 2 in the first preferred embodiment, it is possible to locate the starting point RBP of bending in the regions where the rear projections 27 are provided. Accordingly, it is possible to freely select a location for the starting point of bending, so that freedom in the design is correspondingly increased. Specifically, since an effective wheel base (a length region, in which the track belt 3 is grounded) is desirably short in order to increase the turning capability when running on hard packed snow, it is generally desirable to locate a position of the starting point RBP of bending as forward as possible. However, the location for connecting rear ends of the rear torque arms 23 to the axis of the top connecting shaft 38 is desirably set as rearward as possible taking into account the layout of the rear suspension S. Accordingly, to satisfy such a demand in design, the starting point RBP of bending and the position of the axis of the top connecting shaft 38 are made close to each other in the fore and aft direction, but such an approach does not necessarily allow for easy bending of the slide rail 2. However, according to the first preferred embodiment, the rear bent portion 46 of the slide rail 2 may be arranged near the top connecting shaft 38 whereby it is possible to effectively solve such conflicting demands.

In the first preferred embodiment, the brackets 26 opposed to each other in the vehicle width direction are clamped together and to the slide rails 2 by the bottom connecting shafts 32 provided fore and aft whereby it is possible to ensure a high torsional rigidity. Since the bracket 26 is connected to the slide rail 2 via the fourth idler wheel 47, a further increase in the rigidity is made possible. Also, since such clamping makes it possible to decrease the locations of clamping, it is possible to simultaneously attain convenience in assembly and simplification in construction.

Second Preferred Embodiment

Figure 6:
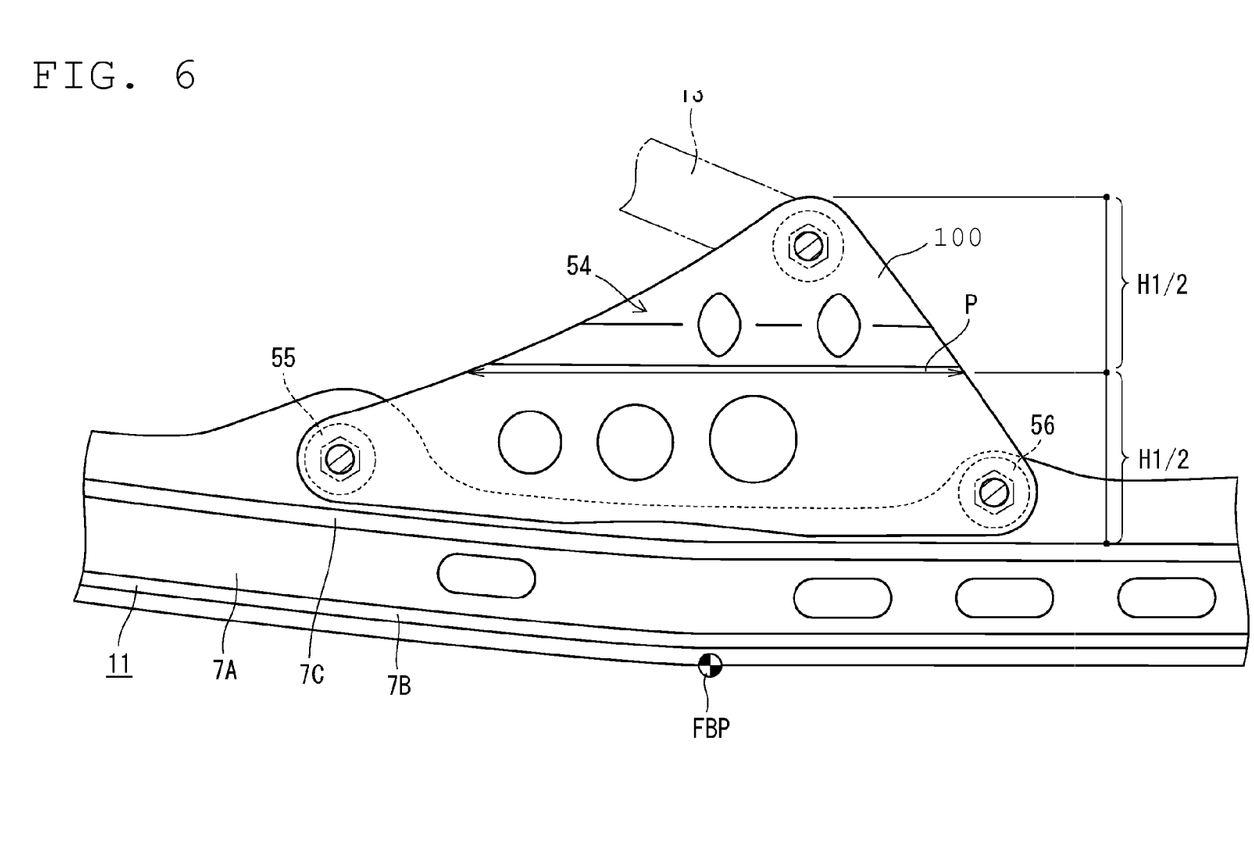
FIG. 6 is a side view showing, in enlarged scale, a periphery of a front bent portion according to a second preferred embodiment of the present invention.

FIG. 6 shows a second preferred embodiment of the present invention. While the front projections 10 are constructed integrally with the slide rail 2 in the first preferred embodiment, a separate bracket 54 in the second preferred embodiment is assembled to the slide rail 2 in the same manner as the rear projections 27. The bracket 54 includes a front projection 100 defining an upper region of the bracket 54 in the present preferred embodiment. The front projection 100 is defined in the same manner as in the first preferred embodiment to indicate a length range shown by the line P in FIG. 6, that is, the upper region of the bracket 54. The construction of and the manner of assembling of the bracket 54 are fundamentally the same as those of the bracket 26 in the first preferred embodiment. Fore and aft ends of a bottom portion of the bracket 54 are clamped together to the slide rail 2 by connecting shafts 55, 56, which are provided between the left and right brackets 54. Preferably, no idler wheel is provided.

While the starting point FBP of bending of the front bent portion 11 in the first preferred embodiment is positioned forwardly of and clear of a range in which the front projection 10 is provided, for the convenience of bending of the slide rail 2, a starting point FBP of bending in the second preferred embodiment is arranged in a range in which the front projection 100 is provided, since bending of the slide rail 2 is possible irrespective of a position of the front projection 100. Thereby, it is possible to position the starting point FBP of bending of the front bent portion 11 rearward as compared with the first preferred embodiment, so that it is possible to ensure a large length range of the front bent portion 11. In other words, it is possible to ensure a long gradual approach to snow present in a traveling direction of the snow vehicle, so that it is possible to decrease the resistance encountered at the time of traveling.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. A rear suspension of a snow vehicle comprising:
   slide rails each including a body portion arranged to guide an endless track belt, the body portion of each of the slide rails including respective ends separated from each other along a length direction thereof, at least one of the ends of the body portion including a bent portion within a predetermined range along the length direction and bent such that a lower edge of the body portion gradually increases in height as it extends toward the end;
   an upwardly extending projection provided above an upper edge of the body portion and extending along a predetermined length thereof; and
   a fore upwardly extending portion and an aft upwardly extending portion provided on the body portion; wherein
   the predetermined length of the upwardly extending projection overlaps with a starting point of bending of the bent portion;
   the upwardly extending projection defines an upper region of a bracket that is separate from the body portion;
   the bracket is attached to the fore upwardly extending portion with a first fixing member and the aft upwardly extending portion with a second fixing member;
   the starting point of bending of the bent portion is arranged between the fore upwardly extending portion and the aft upwardly extending portion; and
   an intermediate region of the body portion provided between the fore upwardly extending portion and the aft upwardly extending portion includes a portion having a lower height than either of the fore upwardly extending portion and the aft upwardly extending portion.

2. The rear suspension of a snow vehicle according to claim 1, wherein the bent portion is located at a rear end of the body portion.

3. The rear suspension of a snow vehicle according to claim 1, wherein the bent portion is located at a front end of the body portion.

4. The rear suspension of a snow vehicle according to claim 1, wherein the projection is substantially triangular-shaped with a single apex at an upper end thereof, and a total height of the projection is defined as a height equal to or larger than approximately ½ of a total height from a top portion of the body portion to the single apex at the upper end of the projection.

5. The rear suspension of a snow vehicle according to claim 1, further comprising a member including a first end connected to the projection, and a second end arranged to be connected to a body frame.

6. The rear suspension of a snow vehicle according to claim 1, further comprising a freely rotating idler wheel mounted to the projection, the idler wheel arranged to guide the track belt.

7. The rear suspension of a snow vehicle according to claim 1, wherein a substantially flat mounting piece projects upwardly from the upper edge of the body portion and includes the fore upwardly extending portion and the aft upwardly extending portion, and the bracket is mounted to the fore upwardly extending portion and the aft upwardly extending portion of the mounting piece.

8. The rear suspension of a snow vehicle according to claim 7, wherein the bracket includes bifurcated legs extending to a lower edge thereof, the bifurcated legs are opposed to each other in a vehicle width direction, and the bracket is fixed to the body portion such that the legs interpose therebetween the mounting piece.

9. The rear suspension of a snow vehicle according to claim 7, wherein the bracket includes overlapping portions in a vehicle width direction, upper ends of the portions are in contact with each other, lower ends of the portions are separated from each other to define leg pieces, and intermediate positions extending from the upper ends to the leg pieces define uneven reinforcement portions.

10. The rear suspension of a snow vehicle according to claim 1, wherein the slide rails are arranged opposite to each other in a vehicle width direction, a shaft is provided between the body portions of the slide rails, and both ends of the shaft are fixed to the body portions via the brackets.

11. The rear suspension of a snow vehicle according to claim 1, further comprising an idler wheel fixed to the bracket and the body portion, the idler wheel arranged to guide the track belt.

12. The rear suspension of a snow vehicle according to claim 1, wherein the projection is substantially triangular-shaped with a single apex at an upper end thereof, and a side of the substantially triangular-shaped projection closer to the bent portion is concavely curved.

* * * * *